(12) United States Patent
Xie et al.

(10) Patent No.: US 12,101,649 B2
(45) Date of Patent: Sep. 24, 2024

(54) SERVICE-BASED ACCESS NETWORK ARCHITECTURE AND COMMUNICATION

(71) Applicant: ZTE Corporation, Shenzhen (CN)

(72) Inventors: Feng Xie, Shenzhen (CN); Tao Qi, Shenzhen (CN); Zheng Peng, Shenzhen (CN); Na Liu, Shenzhen (CN); Guanghui Yu, Shenzhen (CN); Liujun Hu, Shenzhen (CN)

(73) Assignee: ZTE CORPORATION, Shenzhen (CN)

(*) Notice: Subject to any disclaimer, the term of this patent is extended or adjusted under 35 U.S.C. 154(b) by 299 days.

(21) Appl. No.: 17/692,656

(22) Filed: Mar. 11, 2022

(65) Prior Publication Data

US 2022/0201509 A1 Jun. 23, 2022

Related U.S. Application Data

(63) Continuation of application No. PCT/CN2019/108040, filed on Sep. 26, 2019.

(51) Int. Cl.
*H04W 24/02* (2009.01)

(52) U.S. Cl.
CPC .................................. *H04W 24/02* (2013.01)

(58) Field of Classification Search
CPC ..... H04W 24/02; H04W 84/00; H04W 76/10; H04W 76/27; H04W 88/16; H04W 88/182; H04W 8/22; H04W 80/04
See application file for complete search history.

(56) References Cited

U.S. PATENT DOCUMENTS

| | | | |
|---|---|---|---|
| 11,683,858 B2* | 6/2023 | Atarius | H04W 4/08 370/329 |
| 2015/0256349 A1* | 9/2015 | Kim | H04L 12/1407 370/259 |
| 2022/0303934 A1* | 9/2022 | Ianev | H04W 8/183 |

FOREIGN PATENT DOCUMENTS

| | | | | |
|---|---|---|---|---|
| CN | 102625255 A | * | 8/2012 | |
| CN | 108632312 A | | 10/2018 | |
| CN | 109644419 A | | 4/2019 | |
| CN | 109673037 A | | 4/2019 | |
| CN | 111866908 A | * | 10/2020 | H04W 24/02 |
| WO | WO2019034609 | | 2/2019 | |

(Continued)

OTHER PUBLICATIONS

Chinese Office Action and English translation regarding 201980100572.8 dated Jul. 14, 2023, 18 pages.

(Continued)

*Primary Examiner* — Mohamed A Kamara
(74) *Attorney, Agent, or Firm* — Crowell & Moring LLP

(57) ABSTRACT

Methods, systems, and devices related to digital wireless communication, and more specifically, to techniques related to operating an access network with multiple domains. In an example embodiment, a method for wireless communication can include receiving, at a physical resource group control function, a first message on a service-based interface provided by the physical resource group control function. The method may also include, in response to receiving the first message, transmitting, by the physical resource group control function, a second message on the service-based interface provided by the physical resource group control function.

17 Claims, 11 Drawing Sheets

(56) References Cited

FOREIGN PATENT DOCUMENTS

WO  WO2019103462 A1  5/2019
WO  WO2019125258     6/2019

OTHER PUBLICATIONS

Extended European Search Report regarding EP 19 94 6749 dated Sep. 26, 2022, 12 pages.

Pencheva Evelina et al., "Toward Service Based Radio Access Network," 2019 International Conference On Information Technologies (INFOTECH), IEEE, Sep. 19, 2019, pp. 1-4.

Pencheva Evelina et al., "Mobility Management as a Radio Access Network Service," 2019 10th IFIP International Conference On New Technologies, Mobility and Security (NTMS), IEEE, Jun. 24, 2019, pp. 1-5.

Pencheva Evelina et al., "Packet Data Session Management as a Service," 2019 International Symposium On Networks, Computers and Communications (ISNCC), IEEE, Jun. 18, 2019, pp. 1-6.

Pencheva Evelina et al., "An Extension of Mobile Edge Computing Bandwidth Management API," 2018 International Symposium On Networks, Computers and Communications (ISNCC), IEEE, Jun. 19, 2018, pp. 1-6.

International Search Report and Written Opinion of the International Searching Authority regarding PCT/CN2019/108040 dated Jun. 28, 2020, 10 pages.

Nokia et al. "Revised NRM enhancements WI," 1-23, 31-32, 3GPP TSG-SA5 Meeting #124, S5-194269., Jun. 28, 2019.

Hua Wei. "Add 3GPP Management Service deployment basen on ZSM Framework," 24-30, 31-32, 3GPP TSG-SA5 Meeting #126, S5-195945., Aug. 23, 2019.

* cited by examiner

SERVICE-BASED ACCESS NETWORK ARCHITECTURE AND COMMUNICATION

CROSS-REFERENCE TO RELATED APPLICATION

This application is a continuation application of PCT International Patent Application No. PCT/CN2019/108040, filed with the China National Intellectual Property Administration, PRC on Sep. 26, 2019, which is herein incorporated by reference in its entirety.

TECHNICAL DOMAIN

This patent document is directed generally to wireless communications.

BACKGROUND

Mobile communication technologies are moving the world toward an increasingly connected and networked society. The rapid growth of mobile communications and advances in technology have led to greater demand for capacity and connectivity. It may be important to design networks that efficiently use network resources and are efficiently deployed. Other aspects, such as energy consumption, device cost, spectral efficiency, and latency are also important to meeting the needs of various communication scenarios.

SUMMARY

This document discloses methods, systems, and devices related to digital wireless communication, and more specifically, to techniques related to operating an access network that includes multiple domains.

In one exemplary aspect, a method for wireless communication includes receiving, at a physical resource group control function, a first message on a service-based interface provided by the physical resource group control function. The method also includes, in response to receiving the first message, transmitting, by the physical resource group control function, a second message on the service-based interface provided by the physical resource group control function.

In another exemplary aspect, a method for wireless communication includes receiving, at a radio connection control function, a first message on a service-based interface provided by the radio connection control function. The method also includes in response to receiving the first message, transmitting, by the radio connection control function, a second message on the service-based interface provided by the radio connection control function.

In another exemplary aspect, a method for wireless communication includes receiving, at a radio session and bearer control function, a first message on a service-based interface provided by the radio session and bearer control function. The method also includes in response to receiving the first message, transmitting, by the radio session and bearer control function, a second message on the service-based interface provided by the radio session and bearer control function.

In another exemplary aspect, an access network comprises a first part of the access network physical resource group, the first part including a physical resource group control function configured to receive a first message and in response to receiving the first message, transmit a second message on a service-based interface provided by the physical resource group control function. The access network also includes a second part of the access network separate from the physical resource group.

In another exemplary aspect, a method for wireless communication includes operating a wireless communication network partitioned into layered domains in which a cell group layer is related to services related to a physical resource group, a non-cell-group stratum that includes services that are not cell-group specific, and a non-access stratum domain that includes providing mobility services to user devices. The method also includes performing communication between one or more of the layered domains using pre-defined interfaces.

In another exemplary aspect, a wireless communications apparatus comprising a processor is disclosed. The processor is configured to implement a method described herein.

In yet another exemplary aspect, the various techniques described herein may be embodied as processor-executable code and stored on a computer-readable program medium.

Some embodiments may preferably implement the following solutions, written in a clause-format.

1. A solution for wireless communication, comprising: receiving, at a physical resource group control function, a first message on a service-based interface provided by the physical resource group control function; and in response to receiving the first message, transmitting, by the physical resource group control function, a second message on the service-based interface provided by the physical resource group control function.

2. The solution of clause 1, further comprising: transmitting, by the physical resource group control function, a third message to a physical resource group enforcement function directly or via a proxy function between the physical resource group control function and the physical resource group enforcement function, the third message including configuration information for enforcement or a request for status information from the physical resource group enforcement function; and in response to transmitting the third message, receiving, by the physical resource group control function, a fourth message from the physical resource group enforcement function on the service-based interface directly or via the proxy function between the physical resource group control function and the physical resource group enforcement function, the fourth message including resultant configuration information, status notification information, or requested status information from the physical resource group enforcement function.

3. The solution of clause 1, further comprising: transmitting, by the physical resource group control function, a fifth message to a physical resource group data storage function configured to store physical resource group context data, the fifth message including a request to store physical resource group context data or a request for retrieving physical resource group context data; and in response to transmitting the fifth message, receiving, by the physical resource group control function, a sixth message from the physical resource group data storage function, the sixth message including a confirmation that the physical resource group data storage function stored physical resource group context data or physical resource group context data requested in the fifth message.

4. The solution of clause 1, further comprising: transmitting, by the physical resource group control function, a seventh message to a physical resource group intelligence function; and in response to transmitting the sixth message, receiving, by the physical resource group control function, an eighth message from the physical resource group intelligence function, the eighth message including intelligence information provided by the physical resource group intelligence function.

5. The solution of clause 1, further comprising: transmitting, by the physical resource group control function, a ninth message to a physical resource group exposure function; and in response to transmitting the ninth message, receiving, by the physical resource group control function, a tenth message from the physical resource group exposure function on a service-based interface provided by the physical resource group exposure function.

6. The solution of clause 1, wherein a physical resource group is one of a cell group or a beam group.

7. A solution for wireless communication, comprising: receiving, at a radio connection control function, a first message on a service-based interface provided by the radio connection control function; and in response to receiving the first message, transmitting, by the radio connection control function, a second message on the service-based interface provided by the radio connection control function.

8. The solution of clause 7, wherein radio connection control includes functions relating to radio access and mobility management.

9. The solution of clause 7, further comprising: transmitting, by the radio connection control function, a third message to a radio connection data storage function configured to store information relating to radio connection context data, the third message including a request to store physical resource group context data or a request for retrieving radio connection context data; and in response to transmitting the third message, receiving, by the radio connection control function, a fourth message from the radio connection data storage function on a service-based interface provided by the radio connection data storage function, the fourth message including a confirmation that the radio connection data storage function stored physical resource group context data or radio connection context data requested in the third message.

10. The solution of clause 7, further comprising: transmitting, by the radio connection control function, a fifth message to a radio connection intelligence function; and in response to transmitting the fifth message, receiving, by the radio connection control function, a sixth message from the radio connection intelligence function, the sixth message including intelligence information provided by the radio connection intelligence function.

11. The solution of clause 7, further comprising: transmitting, by the radio connection control function, a seventh message to a radio connection exposure function; and in response to transmitting the seventh message, receiving, by the radio connection control function, an eighth message from the radio connection exposure function on a service-based interface provided by the radio connection exposure function.

12. A solution for wireless communication, comprising: receiving, at a radio session and bearer control function, a first message on a service-based interface provided by the radio session and bearer control function; and in response to receiving the first message, transmitting, by the radio session and bearer control function, a second message on the service-based interface provided by the radio session and bearer control function.

13. The solution of clause 12, further comprising: transmitting, by the radio session and bearer control function, a third message to a radio session and bearer enforcement function directly or via a proxy function between the radio session and bearer control function and the radio session and bearer enforcement function, the third message including configuration information for enforcement or a request for status information from the radio session and bearer enforcement function; and in response to transmitting the third message, receiving, by the radio session and bearer control function, a fourth message from the radio session and bearer enforcement function on a service-based interface provided by the radio session and bearer enforcement function directly or via the proxy function between the radio session and bearer control function and the radio session and bearer enforcement function, the fourth message including configuration result information, a status information notification, or requested status information from the radio session and bearer enforcement function.

14. The solution of clause 12, further comprising: transmitting, by the radio session and bearer control function, a fifth message to a radio session and bearer data storage function, the fifth message including a request to store radio session and bearer context data or a request to retrieve radio session and bearer context data; and in response to transmitting the fifth message, receiving, by the radio session and bearer control function, a sixth message from the radio session and bearer data storage function on a service-based interface provided by the radio session and bearer data storage function, the sixth message including a confirmation that the radio session and bearer data storage function stored radio session and bearer context data or radio session and bearer context data requested in the fifth message.

15. The solution of clause 12, further comprising: transmitting, by the radio session and bearer control function, a seventh message to a radio session and bearer intelligence function; and in response to transmitting the seventh message, receiving, by the radio session and bearer control function, an eighth message from the radio session and bearer intelligence function on a service-based interface provided by the radio session and bearer intelligence function.

16. The solution of clause 12, further comprising: transmitting, by the radio session and bearer control function, a ninth message to a radio session and bearer exposure function; and in response to transmitting the ninth message, receiving, by the radio session and bearer control function, a tenth message from the radio session and bearer exposure function on a service-based interface provided by the radio session and bearer exposure function.

17. An access network comprising: a first part of the access network physical resource group, the first part including a physical resource group control function configured to receive a first message and in response to receiving the first message, transmit a second message on a service-based interface provided by the physical resource group control function; and a second part of the access network separate from the physical resource group.

18. The access network of clause 17, wherein the first part of the access network included in the physical resource group control function is configured to: transmit a third message to a physical resource group enforcement function in the first part of the access network either directly or via a proxy function between the physical resource group control function and the physical resource group enforcement function, the third message including a request for status information from the physical resource group enforcement function; and in response to transmitting the third message, receive a fourth message from the physical resource group enforcement function on the service-based interface directly or via the proxy function between the physical resource group control function and the physical resource group enforcement function, the fourth message including the requested status information from the physical resource group enforcement function.

19. The access network of clause 18, wherein the physical resource group enforcement function is configured to forward information to a radio session and bearer enforcement function included in the second part of the access network.

20. The access network of clause 17, further including a radio session and bearer enforcement function configured to: receive a fifth message from a radio session and bearer control function via a radio session and bearer control enforcement proxy function, the radio session and bearer control function and the radio session and bearer control enforcement proxy function included in the second part of the access network; and transmit a sixth message to the radio session and bearer control enforcement proxy function in response to receiving the fifth message.

21. The access network of clause 17, wherein the physical resource group control function is further configured to: transmit a seventh message to a physical resource group data storage function configured to store information relating to physical resource group data, the fifth message including a request for physical resource group data; and in response to transmitting the seventh message, receive an eighth message from the physical resource group data storage function, the sixth message including physical resource group data requested in the seventh message.

22. The access network of clause 17, wherein the physical resource group control function is further configured to: transmit a ninth message to a physical resource group intelligence function; and in response to transmitting the sixth message, receive a tenth message from the physical resource group intelligence function, the eighth message including intelligence information provided by the physical resource group intelligence function.

23. The access network of clause 17, wherein the physical resource group control function is further configured to: transmit an eleventh message to a physical resource group exposure function; and in response to transmitting the ninth message, receive a twelfth message from the physical resource group exposure function on a service-based interface provided by the physical resource group exposure function.

24. A solution of wireless communication, comprising: operating a wireless communication network partitioned into layered domains in which a cell group stratum is related to services related to a physical resource group, a non-cell-group stratum that includes services that are not cell-group specific, and a non-access stratum domain that includes providing mobility services to user devices; performing communication between one or more of the layered domains using pre-defined interfaces.

25. The solution of clause 24, further comprising: controlling access to data and services in the wireless communication network by mapping a radio access network intelligence (RI) domain and a radio access network exposure (RE) domain to the layered domain-based partitioning such that wireless functions are exposed through RE and intelligence data and intelligence control functions are exposed through the RI domain.

26. The solution of clause 24, wherein the cell group layer includes a cell group control function, a cell group control enforcement proxy function connecting the cell group control function to the cell group enforcement function, and a cell group data function.

27. The solution of clause 24, wherein the non-cell-group layer is a radio session domain including a radio session enforcement function, a radio session control function, and the radio session control enforcement proxy function.

28. The solution of clause 24, wherein the non-cell-group stratum is a radio connection domain and includes a radio connection control function and a radio connection data function.

29. The solution of clause 24, wherein the wireless communication network includes a control plane, the control plane including a cell group control function, a radio session control function, a radio communication control function, a radio session control enforcement proxy function, and a radio communication control enforcement proxy function.

30. The solution of clause 24, wherein the wireless communication network includes a user plane, the user plane including the cell group enforcement function, the radio session enforcement function, and a core access function.

31. An apparatus for wireless communication comprising a processor that is configured to carry out the solution of any of solutions 1 to 30.

32. A non-transitory computer readable medium having code stored thereon, the code when executed by a processor, causing the processor to implement a solution recited in any of solutions 1 to 30.

The details of one or more implementations are set forth in the accompanying attachments, the drawings, and the description below. Other features will be apparent from the description and drawings, and from the claims.

DETAILED DESCRIPTION

Figure 1:
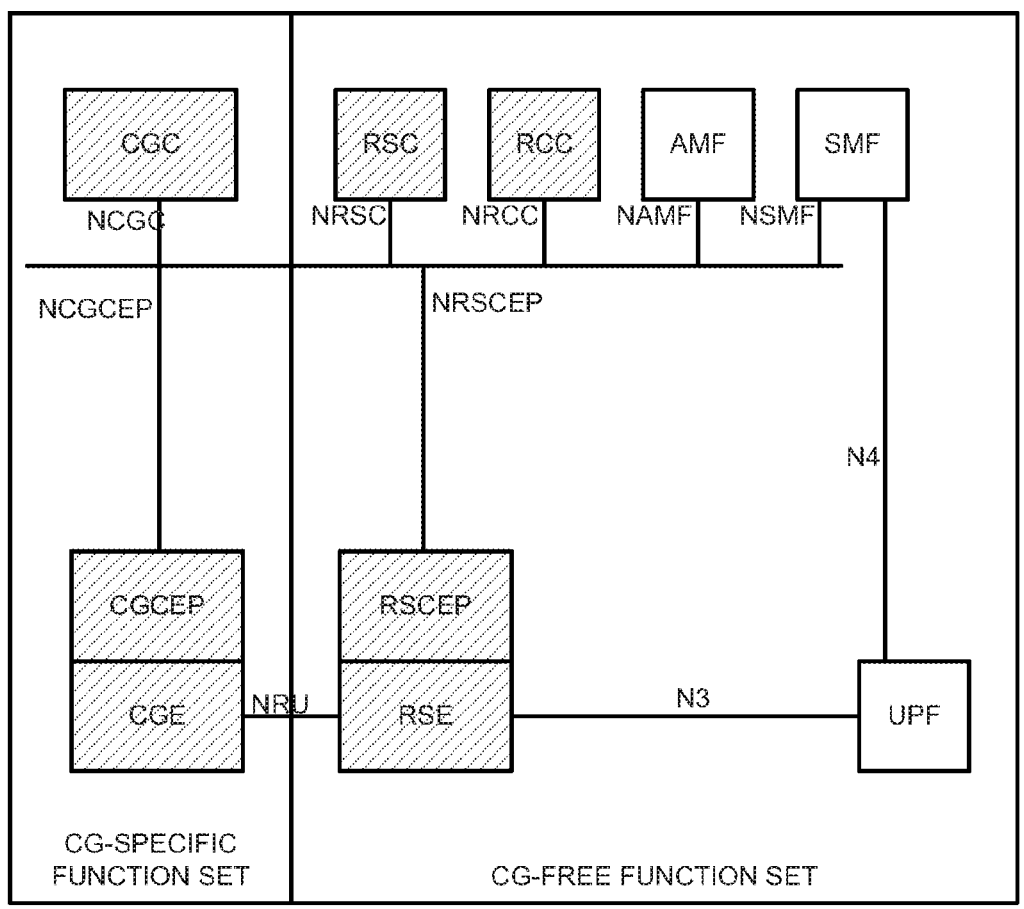
FIG. 1 illustrates a block diagram of a cell group view of an access network function core set.

Section headings are used in the present document only for ease of understanding and do not limit scope of the embodiments to the section in which they are described. Furthermore, while embodiments are described with reference to 5G examples, the disclosed techniques may be applied to wireless systems that use protocols other than 5G or 3GPP protocols.

The development of the new generation of wireless communication—5G New Radio (NR) communication—is a part of a continuous mobile broadband evolution process to meet the requirements of increasing network demand. NR will provide greater throughput to allow more users connected at the same time. Other aspects, such as energy consumption, device cost, spectral efficiency, and latency are also important to meeting the needs of various communication scenarios.

Overview

As wireless communication technologies have evolved, communication technologies are becoming increasingly complex, and supporting services are becoming increasingly abundant, from internet of things (IoT) services with very small throughput to enhanced mobile broadband (eMBB) services with very high throughput requirements. With low latency and high reliability demands in wireless communications, wireless communication networks are expected to be more integrated with various industries.

With the diversification of service types and scenarios supported by wireless communications and the complexity of functions, components in wireless networks may be becoming larger and more complex. The deployment and operation and maintenance of software and hardware may be increasingly challenging, and costs (e.g., time costs, labor costs) may also be high.

The information technology (IT) industry has various theories, tools, communities and practices in engineering and Internet application development, enabling management of complex applications for flexible deployment, scaling, and customization. Further, with the independent evolution of various functions, continuous integration and delivery of functions and the usability and maintainability of these functions may be greatly enhanced. Accordingly, design and development and operation and maintenance costs for wireless communications technologies may be significantly reduced.

In many cases, access network architecture in the existing wireless communication system may be inflexible and may not support modular combination.

System Overview

The present embodiments are directed to access network architectures that include multiple domains. As an example, an access network architecture can include three primary domains, including a cell group domain, a radio connection (RC) domain, and a radio session (RS) domain.

A Cell Group (CG) Stratum may be related to a cell group. A CG domain may be responsible for services relating to the CG, and the services can be either related or unrelated to a terminal (or "UE").

An example service can include an enforcement plane function in the CG domain (or cell group enforcement "CGE"). The CGE may include new radio user plane (NR-U) functionality. In some embodiments, when the CG and RS domains are combined, the NR-U function can be modified to vendor implementations. The CGE may include any of radio link control (RLC), medium access control (MAC), or physical layer (PHY) functionality.

An example service may include CG domain control and enforcement proxy function (or cell group control enforcement proxy "CGCEP") that is associated with the control plane function. In some embodiments, when CGE and CGC are combined, the CGCEP function can be modified to vendor implementations.

An example service may include control functions in the CG domain (or cell group control "CGC"). A CGC function may facilitate air interface control protocols with the UE (such as radio resource control RRC protocol and CG related parts).

An example service may include context storage management and context data functions in the CG domain belonging to the data plane function (or cell group data "CGD").

An example service may include network management function in the CG domain belonging to the management plane function (or cell group management "CGM").

An example service may include cell group exposure (CGX) function to expose information to other functions.

An example service may include intelligence functionality (or cell group intelligence "CGI" function) in the CG domain belonging to the intelligence plane.

A network architecture may include a non-cell-group (NCG) Stratum that is unrelated to the cell group. A radio session (RS) domain may be responsible for radio session and bearer connection, where the services may include parts related and/or unrelated to the UE. An example service may include NG-U (or N3) functions. In some embodiments, when the RS domain and the core network session domain function UPF are combined, this function can be modified to vendor implementations.

An example service may include NR-U functions. In some embodiments, when the CG and RS domain are combined, this function can be modified to vendor implementations.

Other example services may include Service Data Adaptation Protocol (SDAP) or Packet Data Convergence Protocol (PDCP).

The network may include a RS domain control and enforcement proxy function belonging to the control plane function (or radio session control enforcement proxy "RSCEP").

The network may include control functions in the RS domain (or radio session and bearer control "RSC"). RSC may include the control functions for providing services to the SMF and air interface control protocols between the UEs (the original RRC protocol and RS related parts).

The network may include context storage management and context data functions in the RS domain, belonging to the data plane function (or radio session data "RSD").

The network may include network management function in the RS domain, which belongs to the management plane function (or radio session management "RSM").

The network may include radio session exposure function (RSX) in the RS domain, belongs to the exposure plane function.

The network may include Intelligent function in the RS domain (or radio session intelligence "RSI") belonging to an intelligence plane function.

An RC domain may be responsible for radio connectivity, where the RC domain includes services that include parts related and unrelated to the UE. An example service may include Control functions in the RC domain (or radio connection control "RCC"). RCC may include control functions for services provided by AMF and air interface control protocols with UEs (original RRC protocol and RC related parts). In some embodiments, when the RC domain and core network connection management function AMF are combined, the interface between RCC and AMF can be modified to vendor implementations.

In some embodiments, the RCC may request information from enforcement functions (e.g., CGE, RSE). The RCC can send a request for terminal information to CGE, and the CGE may encode and forward the request to the terminal. In response, the CGE may receive the requested information form the terminal and forward the requested information to the RCC.

An example service may include context storage management and context data functions (or radio connection data "RCD") in the RC domain are data plane functions.

An example service may include a radio connection exposure (RCX) function, belonging to the exposure plane function.

An example service may include a network management function in the RC domain (or radio connection management "RCM"), which may belong to the management plane function.

An example service may include an intelligent function in the RC domain (radio connection intelligence "RCI") that may belong to the intelligence plane function.

FIG. 1 illustrates a block diagram 100 of a cell group view of an access network function core set. As shown in FIG. 1, an access network function core set may include both a CG-specific function set and a CG-free function set. The CG-specific function set may include various cell group functions, such as CGC, CGCEP, and CGE. The CG-free function set may include any of RS functions (e.g., RSE, RSCEP, RSC), RC functions (e.g., RCC), and core network components (e.g., AMF, SMF, UPF).

The CGE may communicate with the UE via any of a PHY, MAC, or RLC layer. For example, the CGE may receive data from the UE, and the CGE may forward the data to the RSE via the NR-U interface. The RSE may forward the data to the core network (e.g., UPF) via a N3 interface. The core network may process the data and send a response to the RSE. The RSE may forward the response to the CGE, where the CGE forwards the response to the UE.

In some embodiments, control functions (e.g., CGC, RSC, RCC) may transmit control data to enforcement functions (e.g., CGE, RSE) via proxy functions (e.g., CGCEP, RSCEP).

Figure 2:
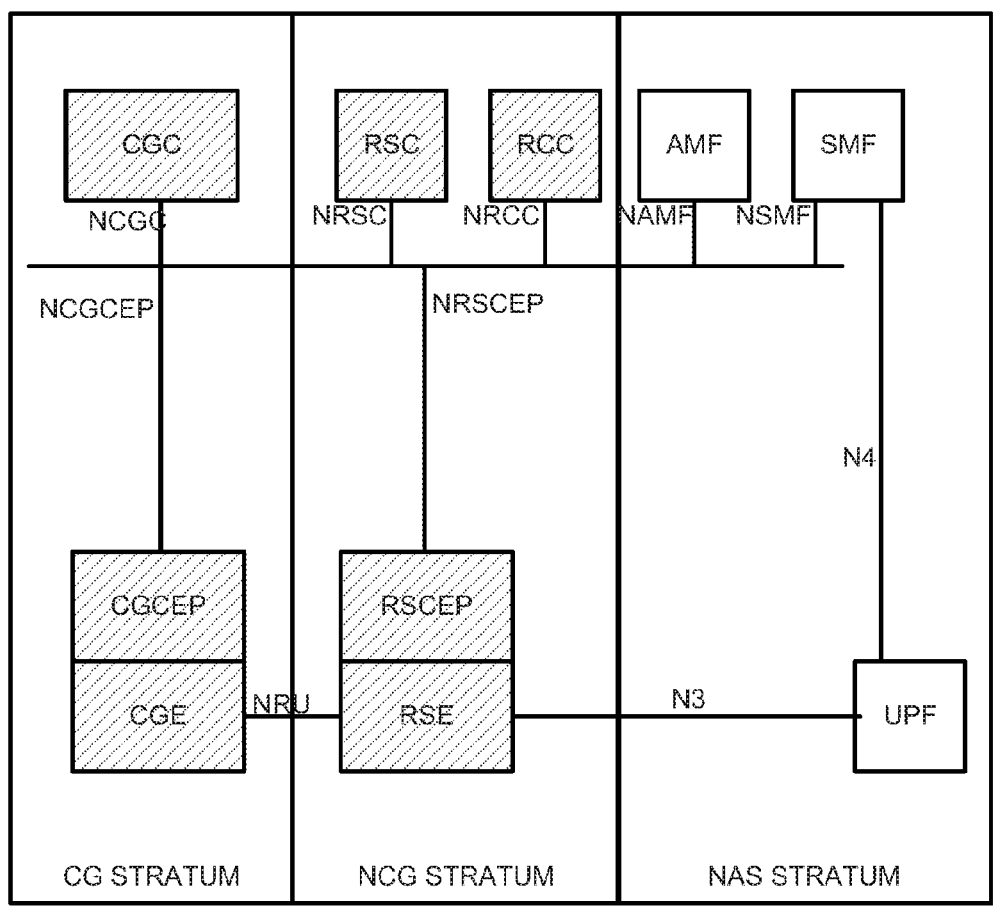
FIG. 2 illustrates a block diagram of a stratum view of an access network function core set.

FIG. 2 illustrates a block diagram 200 of a stratum view of an access network function core set. As shown in FIG. 2, the access network function core set may be divided into various stratums. For example, the access network function core set can include a CG stratum, a NCG stratum, and a NAS stratum.

The CG stratum may include CG functions (e.g., CGE, CGCEP, CGC). The NCG stratum may include RS functions (e.g., RSE, RSCEP, RSC, RCC). The NAS stratum may include core network functions (e.g., UPF, AMF, SMF).

Figure 3:
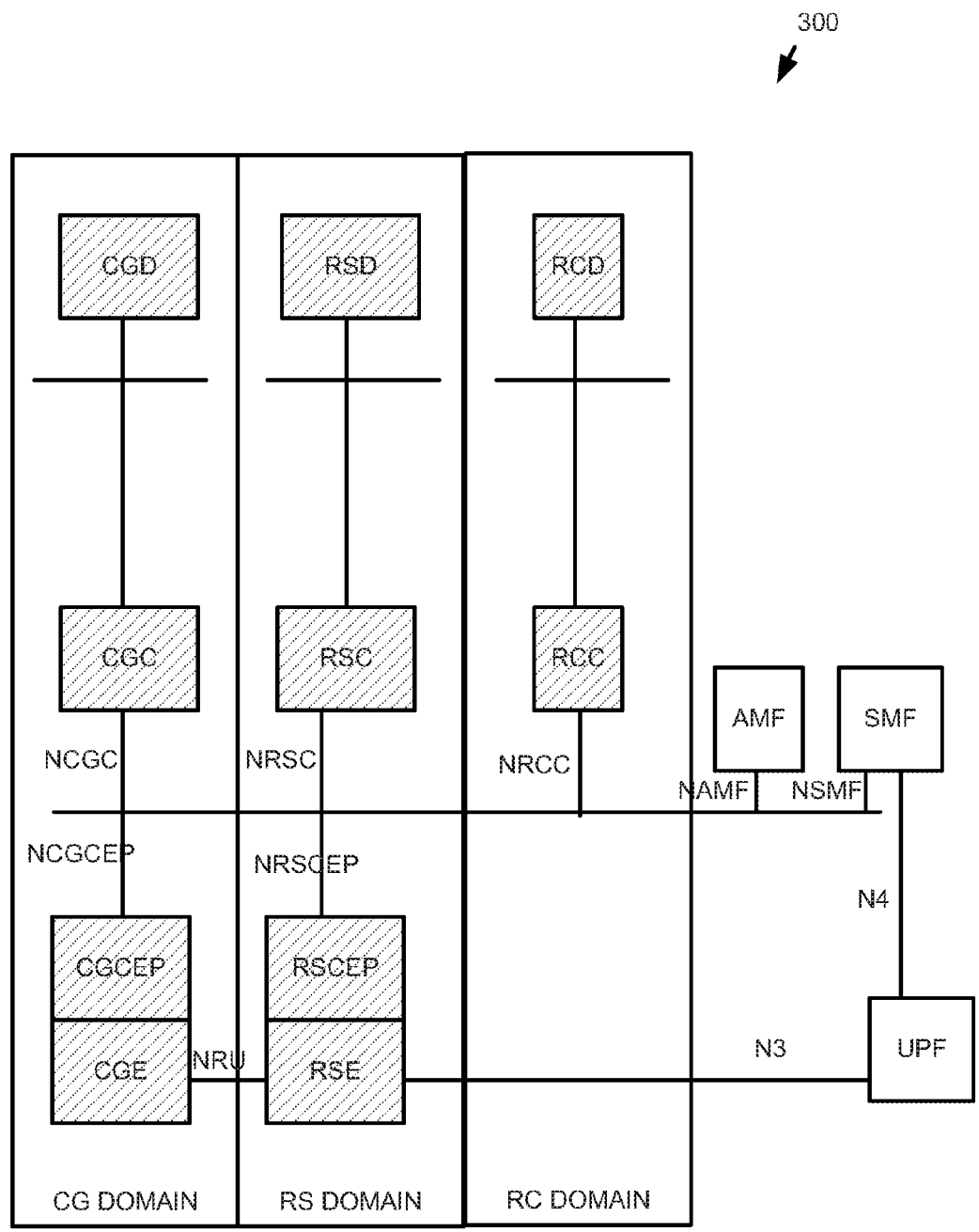
FIG. 3 illustrates a block diagram of a domain view of an access network function core set.

FIG. 3 illustrates a block diagram 300 of a domain view of an access network function core set. As shown in FIG. 3, the access network function core set may be divided into multiple domains.

For example, the access network function core set can include a CG domain, a RS domain, and a RC domain. The CG domain may include CG functions (e.g., CGE, CGCEP, CGC, CGD). The RS domain may include RS functions (e.g., RSE, RSCEP, RSC, RSD). The RC domain may include RC functions (e.g., RCC, RCD). The core network functions (e.g., UPF, AMF, SMF) may be outside of the domains.

Figure 4:
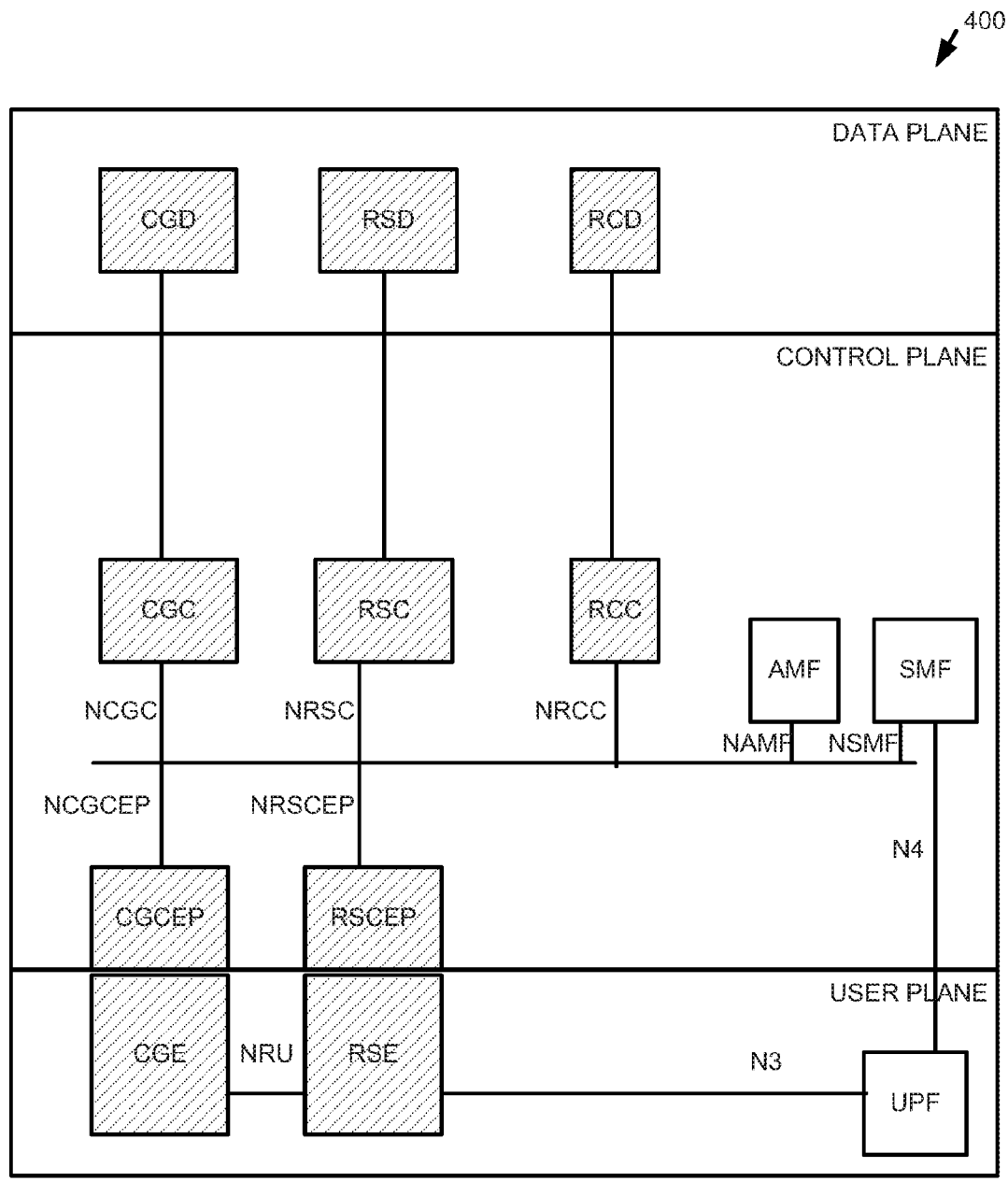
FIG. 4 illustrates a block diagram of a plane view of an access network function core set.

FIG. 4 illustrates a block diagram 400 of a plane view of an access network function core set. As shown in FIG. 4, the access network function core set may be divided into multiple planes.

For example, the access network function core set can include a data plane, a control plane, and a user plane. The data plane may include data storage functions (e.g., CGD, RSD, RCD). Data storage functions may store specific information. For example, the CGD may store UE context information.

The control plane may include various control functions (e.g., CGC, RSC, RCC, AMF, SMF). The control plane may also include proxy functions CGCEP and RSCEP. The user plane may include CGE, RSE, and UPF.

The architectures as described with respect to FIGS. 1-4 may include any of the features described herein. The architectures may include control functions in various domains that support service based interfaces, such as API-based interfaces.

In some embodiments, bus interfaces may be included between control functions in different domains. Accordingly, RCC/CGC/RSC can use other services through each other's service based interfaces. For example, RCC can call the service interface provided by CGC or RSC control functions. The CGC and RSC functions can also invoke the service based interface of the RCC function to support access, mobility, NCG messaging, etc.

The bus-like interface may facilitate interactions between RCC and AMF and the RSC and SMF. For example, AMF can call the service interface provided by RCC, and RCC can also call AMF service interface to support access, mobility, NAS messaging, etc.

The enforcement functions may provide support for an NRU interface and/or N3 interfaces between domain enforcement functions.

In some embodiments, functions associated with a control enforcement proxy (CEP) (e.g., CGCEP, RSCEP) may be only open to control functions in the domain. The interface provided by the data plane may also be open only to the control functions in the domain.

FIGS. 5-8 illustrate an access network function extension set. The extension set may include a RAN exposure (RE) domain and a RAN Intelligence domain functions.

If capacity exposure and intelligence are used as separate domains, the RAN exposure (RE) domain and the RAN Intelligence (RI) domain, respectively, may include the RE domain responsible for the exposure of radio functions. The RE domain may include RAN exposure control (REC) and/or RAN exposure data (RED).

The RI domain may be responsible for radio intelligence (data collection and analysis). The RI domain may include RAN intelligent control (RIC) and/or RAN intelligence data (RID).

The REC function can request a status control message relating to a status of a UE. For example, the REC can send a status control request from the RCC or RSC. The RCC/RSC can forward the status control request to CGE/RSE via proxy functions (e.g., CGCEP, RSCEP) to retrieve the status information from the terminal. In some embodiments, RS functions (e.g., RSC) can request status control information relating to the terminal.

In some embodiments, the REC function can perform various tasks relating to received data, such as big data analysis. The REC function can gather data and transmit the data to external devices.

Figure 5:
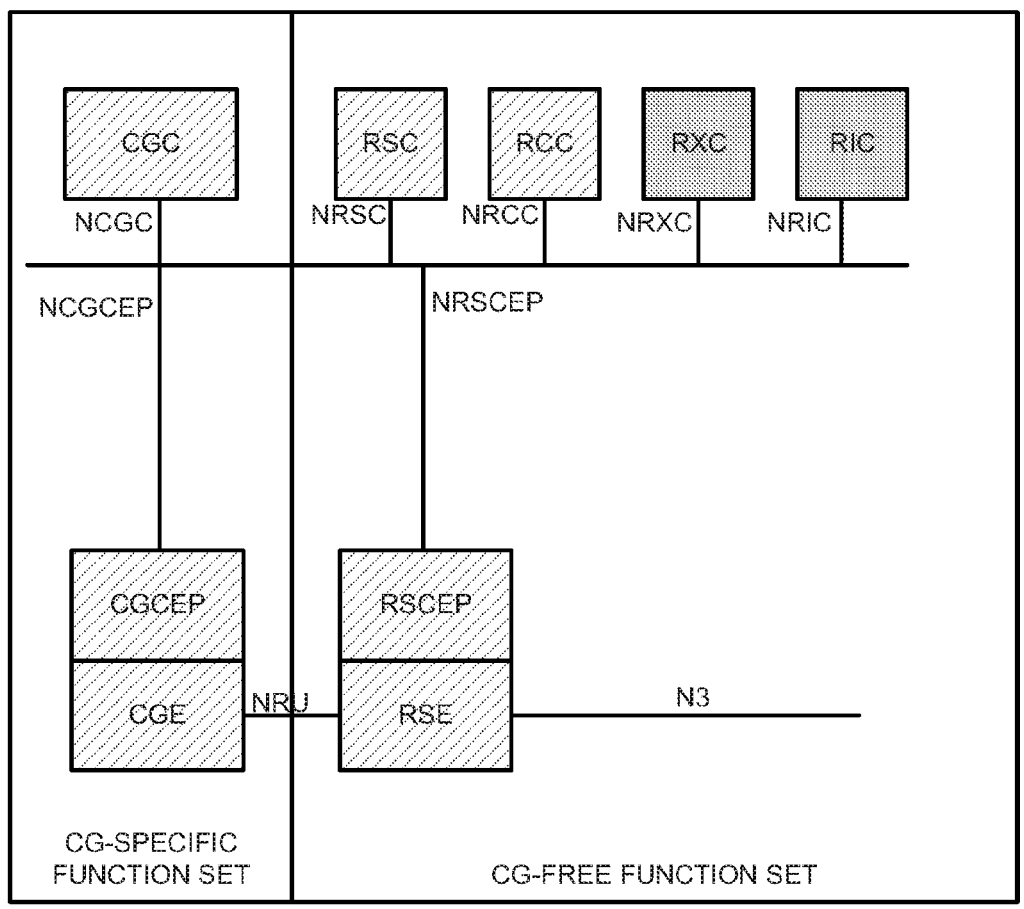
FIG. 5 illustrates a block diagram of a cell group view of an access network function extension set.

FIG. 5 illustrates a block diagram 500 of a cell group view of an access network function extension set. As shown in FIG. 5, an access network function core set may include both a CG-specific function set and a CG-free function set. The CG-specific function set may include various cell group functions, such as CGC, CGCEP, and CGE. The CG-free function set may include any of RS functions (e.g., RSE, RSCEP, RSC), RC functions (e.g., RCC). Further, the CG-free function set may include extension set functions (e.g., REC, RIC).

Figure 6:
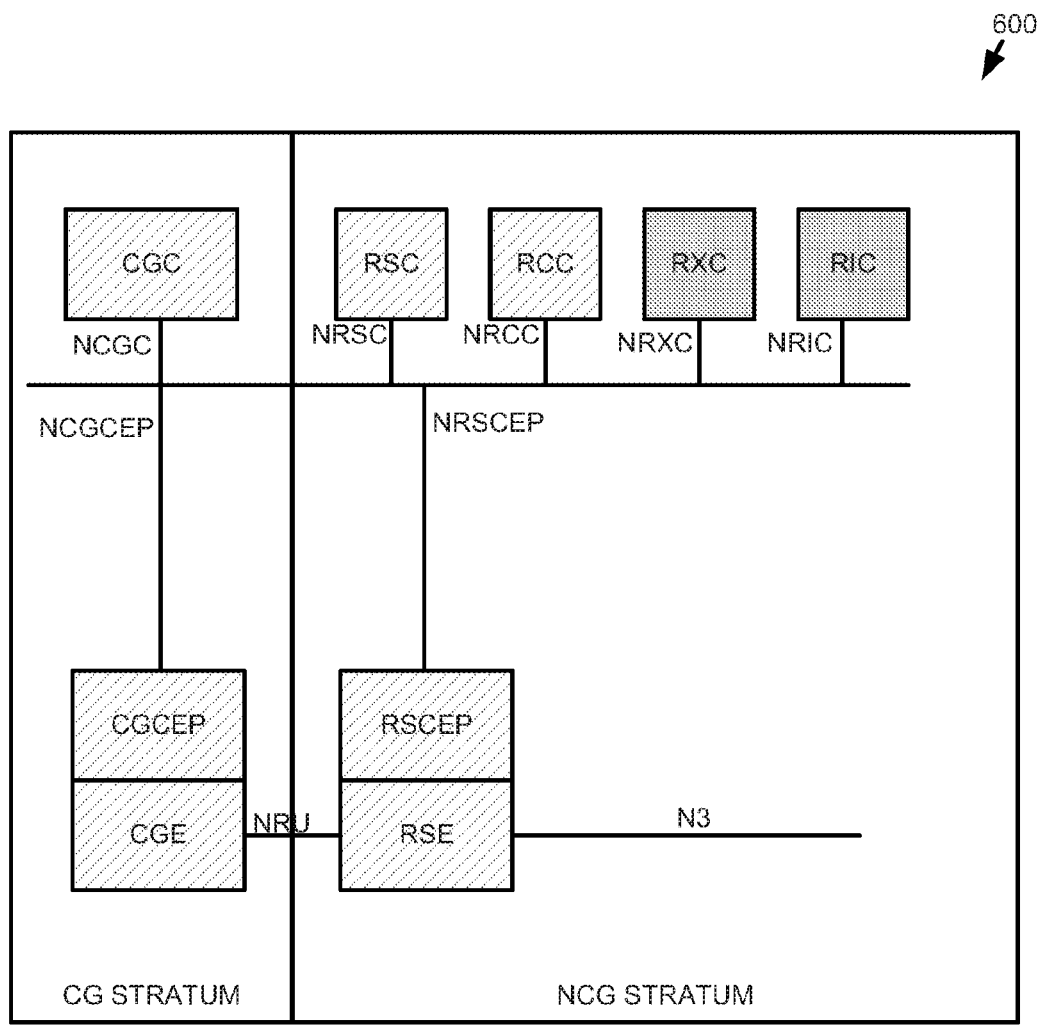
FIG. 6 illustrates a block diagram of a stratum view of an access network function extension set.

FIG. 6 illustrates a block diagram 600 of a stratum view of an access network function extension set. As shown in FIG. 6, the access network function core set may be divided into various stratums. For example, the access network function core set can include a CG stratum and a NCG stratum.

The CG stratum may include CG functions (e.g., CGE, CGCEP, CGC). The NCG stratum may include RS functions and RC functions (e.g., RSE, RSCEP, RSC, RCC). The NGC stratum may include extension set functions (e.g., REC, RIC).

Figure 7:
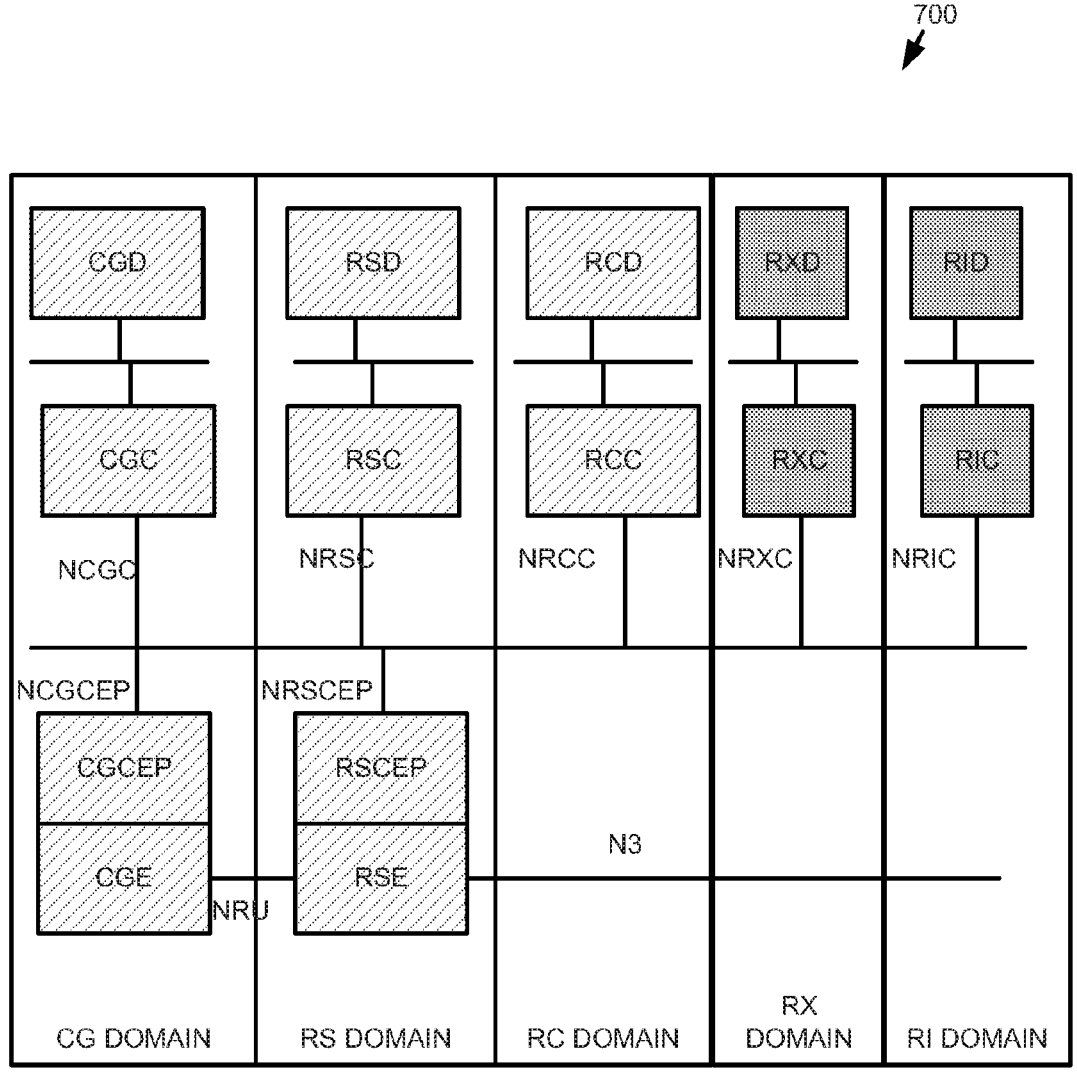
FIG. 7 illustrates a block diagram of a domain view of an access network function extension set.

FIG. 7 illustrates a block diagram 700 of a domain view of an access network function extension set. As shown in FIG. 7, the access network function core set may be divided into multiple domains.

For example, the access network function core set can include a CG domain, a RS domain, a RC domain, a RE domain, and a RI domain. The CG domain may include CG functions (e.g., CGE, CGCEP, CGC, CGD). The RS domain may include RS functions (e.g., RSE, RSCEP, RSC, RSD). The RC domain may include RC functions (e.g., RCC, RCD). The RE domain may include RE functions (e.g., REC, RED). The RI domain may include RI functions (e.g., RIC, RID).

Figure 8:
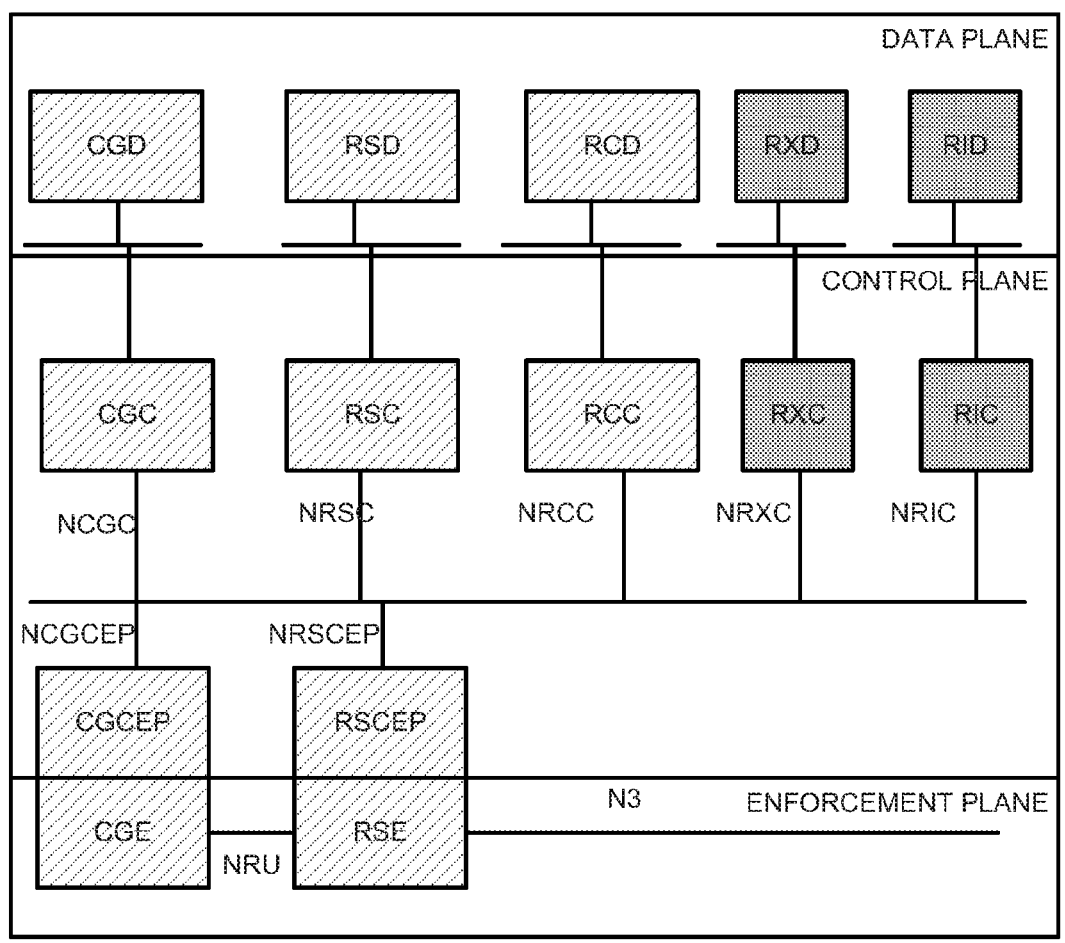
FIG. 8 illustrates a block diagram of a plane view of an access network function extension set.

FIG. 8 illustrates a block diagram 800 of a plane view of an access network function extension set. As shown in FIG. 8, the access network function core set may be divided into multiple planes.

For example, the access network function core set can include a data plane, a control plane, and an enforcement plane. The data plane may include context data storage functions (e.g., CGD, RSD, RCD, RED, RID).

The control plane may include various control functions (e.g., CGC, RSC, RCC, REC, RIC). The control plane may also include CEP functions (e.g., CGCEP, RSCEP). The enforcement plane may include various enforcement functions (e.g., CGE, RSE).

An access network architecture may include more than one domain, defined as a set of functions that can be independently evolved and modified. The domains may include a cell group domain, a radio session domain (or radio bearer or forwarding), and a radio connection domain (or radio access and mobility management).

A cell group domain may include PHY and control functions (a control function may include configuring the PHY of a UE). The cell group domain may include a MAC, a RLC, and a forwarding interface between a cell group domain and the radio session domain, and control functions for MAC/RLC and the forwarding interface. Any of PHY/MAC/RLC/NR-U may be an enforcement function.

A radio session domain may include PDCP and control functions. A control function may include configuring the PCP of the UE. The radio session domain may include SDAP, an interface between the cell group domain and the radio session domain (e.g., NR-U), an interface between radio session domain and the core network (e.g., NG-U, N3 interface), and their control functions, where any of PDCP/SDAP/NR-U/NG-U may be an enforcement function.

A radio connection domain may include control functions relating to a connection state of the UE. The radio connection domain may include control functions relating to access and mobility management.

Control functions in a domain may provide a service-based interface, such as an application programming interface (API), for other control functions (e.g., control functions in this domain or another domain). The service-based interface may support request and response messages. For example, the service-based interface may support the transmission of a CGC.request message and a CGC.response message. Other domain control functions, such as RCC, may send a CGC.request message to the CGC function and receive a CGC.response message from the CGC. The CGC.request message and a CGC.response message may include UE-specific information and/or function-specific messages.

The control function of each domain may control an enforcement function through a proxy function between the control function and the enforcement function. The support function may include an interface between the control function and the enforcement function.

Figure 9:
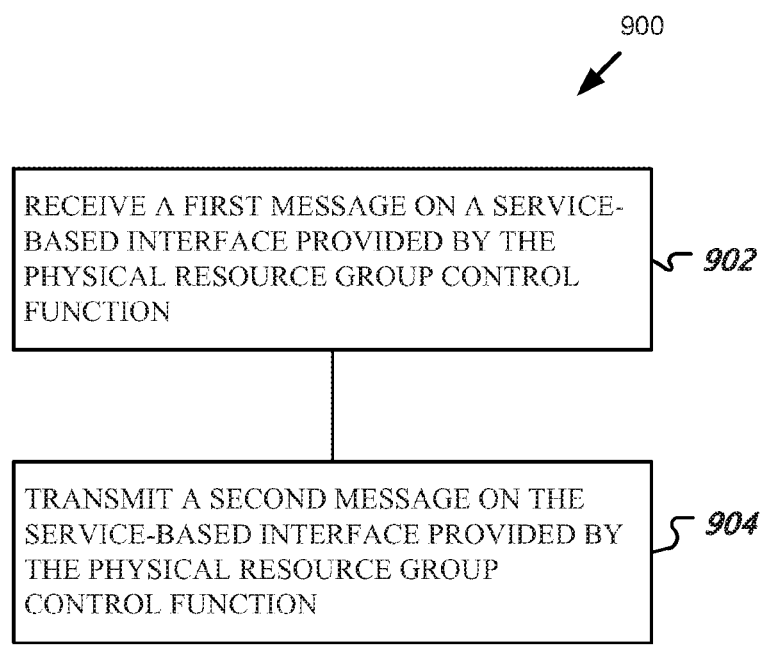
FIG. 9 illustrates a block diagram of a method for operating an access network.

FIG. 9 illustrates a block diagram 900 of a method for operating an access network. The method may include receiving, at a physical resource group control function, a first message on a service-based interface provided by the physical resource group control function (block 902). The physical resource group may include a cell group or CG-specific function set as described in the present embodiments. The first message can be received from any of: the RSC, RCC, CGCEP, or a terminal. The physical resource group control function can include the CGC function as described in the present embodiments.

The method may also include, in response to receiving the first message, transmitting, by the physical resource group control function, a second message on the service-based interface provided by the physical resource group control function (block 904). The service-based interface provided by the physical resource group control function may include the NCGC as described in the present embodiments. The physical resource group control function may send the second message to any of the CGCEP, RSC, RCC, and a terminal.

In some embodiments, the method includes transmitting, by the physical resource group control function, a third message to a physical resource group enforcement function directly or via a proxy function between the physical resource group control function and the physical resource group enforcement function, the third message including configuration information for enforcement or a request for status information from the physical resource group enforcement function. The method may also include in response to transmitting the third message, receiving, by the physical resource group control function, a fourth message from the physical resource group enforcement function on the service-based interface directly or via the proxy function between the physical resource group control function and the physical resource group enforcement function, the fourth message including resultant configuration information, status notification information, or requested status information from the physical resource group enforcement function.

In some embodiments, the method includes transmitting, by the physical resource group control function, a fifth message to a physical resource group data storage function configured to store physical resource group context data, the fifth message including a request to store physical resource group context data or a request for retrieving physical resource group context data. The method may also include in response to transmitting the fifth message, receiving, by the physical resource group control function, a sixth message from the physical resource group data storage function, the sixth message including a confirmation that the physical resource group data storage function stored physical resource group context data or physical resource group context data requested in the fifth message.

In some embodiments, the method includes transmitting, by the physical resource group control function, a seventh message to a physical resource group intelligence function. The method may also include in response to transmitting the sixth message, receiving, by the physical resource group control function, an eighth message from the physical resource group intelligence function, the eighth message including intelligence information provided by the physical resource group intelligence function.

In some embodiments, the method includes transmitting, by the physical resource group control function, a ninth message to a physical resource group exposure function. The method may also include in response to transmitting the ninth message, receiving, by the physical resource group control function, a tenth message from the physical resource group exposure function on a service-based interface provided by the physical resource group exposure function.

In some embodiments, a physical resource group is one of a cell group or a beam group.

In some embodiments, a method for wireless communication comprises receiving, at a radio connection control function, a first message on a service-based interface provided by the radio connection control function. The method may also include in response to receiving the first message, transmitting, by the radio connection control function, a second message on the service-based interface provided by the radio connection control function.

In some embodiments, radio connection control includes functions relating to radio access and mobility management.

In some embodiments, the method includes transmitting, by the radio connection control function, a third message to a radio connection data storage function configured to store information relating to radio connection context data, the third message including a request to store physical resource group context data or a request for retrieving radio connection context data. The method may also include in response to transmitting the third message, receiving, by the radio connection control function, a fourth message from the radio connection data storage function on a service-based interface provided by the radio connection data storage function, the fourth message including a confirmation that the radio connection data storage function stored physical resource group context data or radio connection context data requested in the third message.

In some embodiments, the method includes transmitting, by the radio connection control function, a fifth message to a radio connection intelligence function. The method may also include in response to transmitting the fifth message, receiving, by the radio connection control function, a sixth message from the radio connection intelligence function, the sixth message including intelligence information provided by the radio connection intelligence function.

In some embodiments, the method includes transmitting, by the radio connection control function, a seventh message to a radio connection exposure function. The method may include in response to transmitting the seventh message, receiving, by the radio connection control function, an eighth message from the radio connection exposure function on a service-based interface provided by the radio connection exposure function.

In some embodiments, a method for wireless communication comprises receiving, at a radio session and bearer control function, a first message on a service-based interface provided by the radio session and bearer control function. The method also includes in response to receiving the first message, transmitting, by the radio session and bearer control function, a second message on the service-based interface provided by the radio session and bearer control function.

In some embodiments, the method includes transmitting, by the radio session and bearer control function, a third message to a radio session and bearer enforcement function directly or via a proxy function between the radio session and bearer control function and the radio session and bearer enforcement function, the third message including configuration information for enforcement or a request for status information from the radio session and bearer enforcement function. The method also includes in response to transmitting the third message, receiving, by the radio session and bearer control function, a fourth message from the radio session and bearer enforcement function on a service-based interface provided by the radio session and bearer enforcement function directly or via the proxy function between the radio session and bearer control function and the radio session and bearer enforcement function, the fourth message including configuration result information, a status information notification, or requested status information from the radio session and bearer enforcement function.

In some embodiments, the method includes transmitting, by the radio session and bearer control function, a fifth message to a radio session and bearer data storage function, the fifth message including a request to store radio session and bearer context data or a request to retrieve radio session and bearer context data. The method also includes in response to transmitting the fifth message, receiving, by the radio session and bearer control function, a sixth message from the radio session and bearer data storage function on a service-based interface provided by the radio session and bearer data storage function, the sixth message including a confirmation that the radio session and bearer data storage function stored radio session and bearer context data or radio session and bearer context data requested in the fifth message.

In some embodiments, the method includes transmitting, by the radio session and bearer control function, a seventh message to a radio session and bearer intelligence function. The method also includes in response to transmitting the seventh message, receiving, by the radio session and bearer control function, an eighth message from the radio session and bearer intelligence function on a service-based interface provided by the radio session and bearer intelligence function.

In some embodiments, the method includes transmitting, by the radio session and bearer control function, a ninth message to a radio session and bearer exposure function. The method also includes in response to transmitting the ninth message, receiving, by the radio session and bearer control function, a tenth message from the radio session and bearer exposure function on a service-based interface provided by the radio session and bearer exposure function.

In some embodiments, an access network comprises a first part of the access network physical resource group, the first part including a physical resource group control function configured to receive a first message and in response to receiving the first message, transmit a second message on a service-based interface provided by the physical resource group control function. The access network may include a second part of the access network separate from the physical resource group.

In some embodiments, the first part of the access network included in the physical resource group control function is configured to: transmit a third message to a physical resource group enforcement function in the first part of the access network either directly or via a proxy function between the physical resource group control function and the physical resource group enforcement function, the third message including a request for status information from the physical resource group enforcement function, and in response to transmitting the third message, receive a fourth message from the physical resource group enforcement function on the service-based interface directly or via the proxy function between the physical resource group control function and the physical resource group enforcement function, the fourth message including the requested status information from the physical resource group enforcement function.

In some embodiments, the physical resource group enforcement function is configured to forward information to a radio session and bearer enforcement function included in the second part of the access network.

In some embodiments, the access network includes a radio session and bearer enforcement function configured to: receive a fifth message from a radio session and bearer control function via a radio session and bearer control enforcement proxy function, the radio session and bearer control function and the radio session and bearer control enforcement proxy function included in the second part of the access network, and transmit a sixth message to the radio session and bearer control enforcement proxy function in response to receiving the fifth message.

In some embodiments, the physical resource group control function is further configured to: transmit a seventh message to a physical resource group data storage function configured to store information relating to physical resource group data, the fifth message including a request for physical resource group data; and in response to transmitting the seventh message, receive an eighth message from the physical resource group data storage function, the sixth message including physical resource group data requested in the seventh message.

In some embodiments, the physical resource group control function is further configured to: transmit a ninth message to a physical resource group intelligence function, and in response to transmitting the sixth message, receive a tenth message from the physical resource group intelligence function, the eighth message including intelligence information provided by the physical resource group intelligence function.

In some embodiments, the physical resource group control function is further configured to: transmit an eleventh message to a physical resource group exposure function, and in response to transmitting the ninth message, receive a twelfth message from the physical resource group exposure function on a service-based interface provided by the physical resource group exposure function.

In some embodiments, a method of wireless communication comprises operating a wireless communication network partitioned into layered domains in which a cell group stratum is related to services related to a physical resource group, a non-cell-group stratum that includes services that are not cell-group specific, and a non-access stratum domain that includes providing mobility services to user devices. The method may also include performing communication between one or more of the layered domains using predefined interfaces.

In some embodiments, the method includes controlling access to data and services in the wireless communication network by mapping a radio access network intelligence (RI) domain and a radio access network exposure (RE) domain to the layered domain-based partitioning such that wireless functions are exposed through RE and intelligence data and intelligence control functions are exposed through the RI domain.

In some embodiments, the cell group stratum includes a cell group control function, a cell group control enforcement proxy function connecting the cell group control function to the cell group enforcement function, and a cell group data function.

In some embodiments, the non-cell-group stratum is a radio session domain including a radio session enforcement function, a radio session control function, and the radio session control enforcement proxy function.

In some embodiments, the non-cell-group stratum is a radio connection domain and includes a radio connection control function and a radio connection data function.

In some embodiments, the wireless communication network includes a control plane, the control plane including a cell group control function, a radio session control function, a radio connection control function, a radio session control enforcement proxy function, and a radio connection control enforcement proxy function.

In some embodiments, the wireless communication network includes a user plane, the user plane including the cell group enforcement function, the radio session enforcement function, and a core access function.

Figure 10:
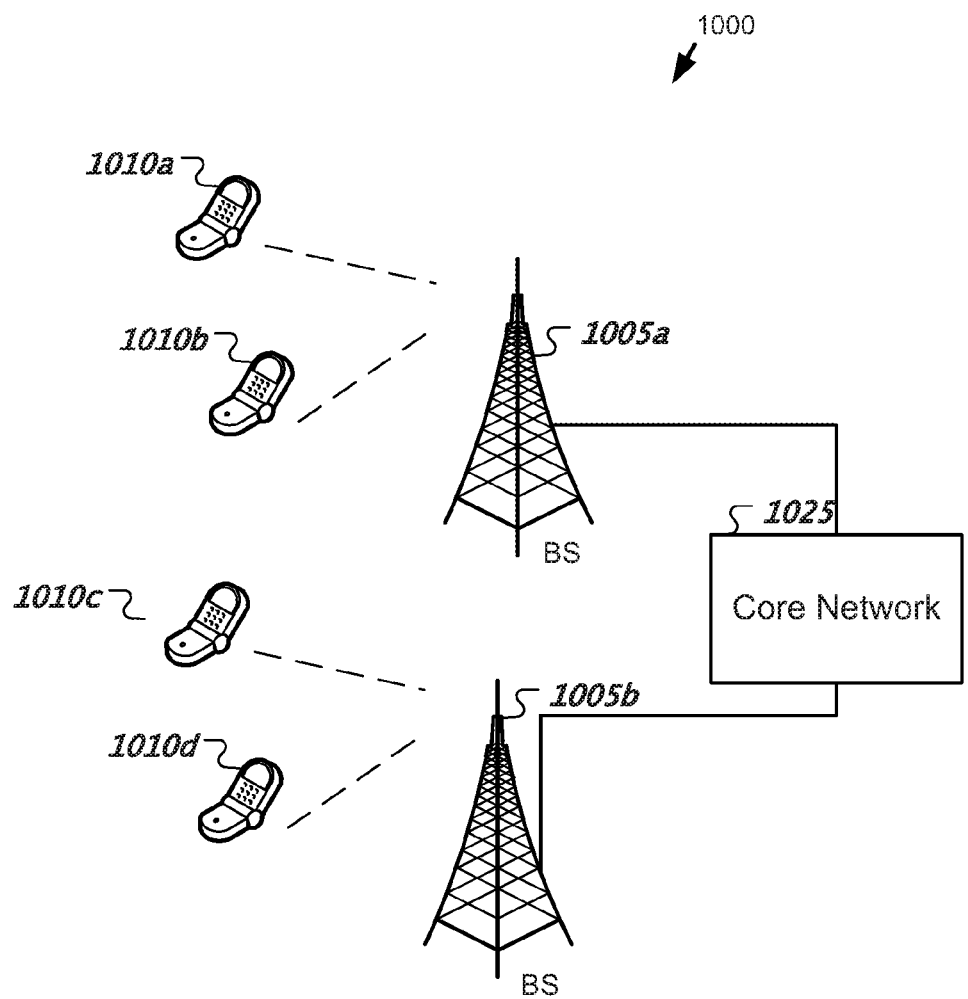
FIG. 10 shows an example of a wireless communication system where techniques in accordance with one or more embodiments of the present technology can be applied.

FIG. 10 shows an example of a wireless communication system where techniques in accordance with one or more embodiments of the present technology can be applied. A wireless communication system 1000 can include one or more base stations (BSs) 1005a, 1005b, one or more wireless devices 1010a, 1010b, 1010c, 1010d, and a core network 1025. A base station 1005a, 1005b can provide wireless service to wireless devices 1010a, 1010b, 1010c and 1010d in one or more wireless sectors. In some implementations, a base station 1005a, 1005b includes directional antennas to produce two or more directional beams to provide wireless coverage in different sectors.

The core network 1025 can communicate with one or more base stations 1005a, 1005b. The core network 1025 provides connectivity with other wireless communication systems and wired communication systems. The core network may include one or more service subscription databases to store information related to the subscribed wireless devices 1010a, 1010b, 1010c, and 1010d. A first base station 1005a can provide wireless service based on a first radio access technology, whereas a second base station 1005b can provide wireless service based on a second radio access technology. The base stations 1005a and 1005b may be co-located or may be separately installed in the domain according to the deployment scenario. The wireless devices 1010a, 1010b, 1010c, and 1010d can support multiple different radio access technologies. In some embodiments, the base stations 1005a, 1005b may be configured to implement some techniques described in the present document. The wireless devices 1010a to 1010d may be configured to implement some techniques described in the present document.

In some implementations, a wireless communication system can include multiple networks using different wireless technologies. A dual-mode or multi-mode wireless device includes two or more wireless technologies that could be used to connect to different wireless networks.

Figure 11:
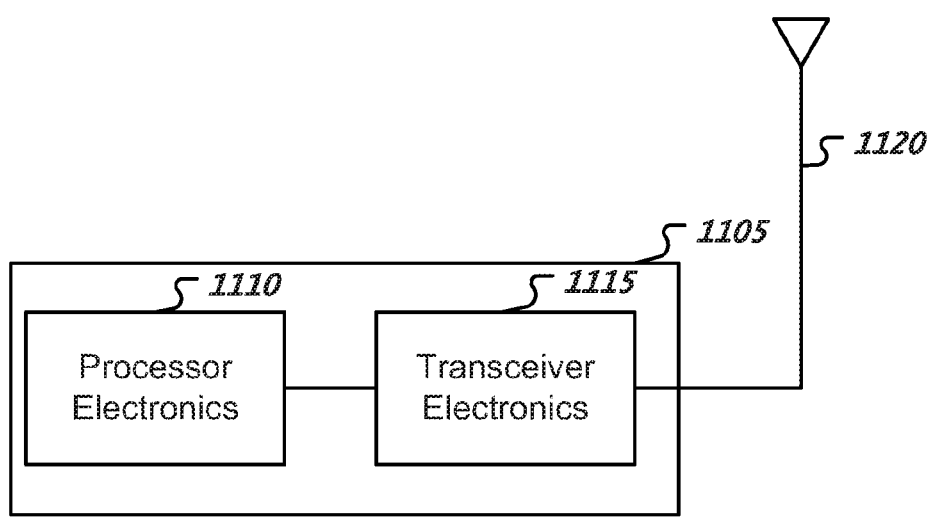
FIG. 11 is a block diagram representation of a portion of a hardware platform.

FIG. 11 is a block diagram representation of a portion of a hardware platform. The communication node as described in the present application may include the hardware platform as described with respect to FIG. 11. A hardware platform 1105 such as a network device or a base station or a wireless device (or UE) can include processor electronics 1110 such as a microprocessor that implements one or more of the techniques presented in this document. The hardware platform 1105 can include transceiver electronics 1115 to send and/or receive wired or wireless signals over one or more communication interfaces such as antenna 1120 or a wireline interface. The hardware platform 1105 can implement other communication interfaces with defined protocols for transmitting and receiving data. The hardware platform 1105 can include one or more memories (not explicitly shown) configured to store information such as data and/or instructions. In some implementations, the processor electronics 1110 can include at least a portion of the transceiver electronics 1115. In some embodiments, at least some of the disclosed techniques, modules or functions and network nodes are implemented using the hardware platform 1105.

From the foregoing, it will be appreciated that specific embodiments of the presently disclosed technology have been described herein for purposes of illustration, but that various modifications may be made without deviating from the scope of the invention. Accordingly, the presently disclosed technology is not limited except as by the appended claims.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for enforcement by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an enforcement environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (domain programmable gate array) or an ASIC (application specific integrated circuit).

Processors suitable for the enforcement of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described, and other implementations, enhancements and variations can be made based on what is described and illustrated in this patent document.

The invention claimed is:

1. A method for wireless communication, comprising:
receiving, at a physical resource group control function, a first message on a service-based interface provided by the physical resource group control function;
in response to receiving the first message, transmitting, by the physical resource group control function, a second message on the service-based interface provided by the physical resource group control function;
transmitting, by the physical resource group control function, a third message to a physical resource group enforcement function directly or via a proxy function between the physical resource group control function and the physical resource group enforcement function, the third message including configuration information for enforcement or a request for status information from the physical resource group enforcement function; and
in response to transmitting the third message, receiving, by the physical resource group control function, a fourth message from the physical resource group enforcement function on the service-based interface directly or via the proxy function between the physical resource group control function and the physical resource group enforcement function, the fourth message including resultant configuration information, status notification information, or requested status information from the physical resource group enforcement function.

2. The method of claim 1, further comprising:
transmitting, by the physical resource group control function, a fifth message to a physical resource group data storage function configured to store physical resource group context data, the fifth message including a request to store physical resource group context data or a request for retrieving physical resource group context data; and
in response to transmitting the fifth message, receiving, by the physical resource group control function, a sixth message from the physical resource group data storage function, the sixth message including a confirmation that the physical resource group data storage function stored physical resource group context data or physical resource group context data requested in the fifth message.

3. The method of claim 1, further comprising:
transmitting, by the physical resource group control function, a fifth message to a physical resource group intelligence function; and in response to transmitting the fifth message, receiving, by the physical resource group control function, a sixth message from the physical resource group intelligence function, the sixth message including intelligence information provided by the physical resource group intelligence function.

4. The method of claim 1, further comprising:
transmitting, by the physical resource group control function, a fifth message to a physical resource group exposure function; and
in response to transmitting the fifth message, receiving, by the physical resource group control function, a sixth message from the physical resource group exposure function on a service-based interface provided by the physical resource group exposure function.

5. The method of claim 1, wherein a physical resource group is one of a cell group or a beam group.

6. An apparatus for wireless communication comprises a processor that is configured to carry out the method of claim 1.

7. A non-transitory computer readable medium having code stored thereon, the code when executed by a processor, causing the processor to implement a method recited in claim 1.

8. A method for wireless communication, comprising:
receiving, at a radio connection control function, a first message on a service-based interface provided by the radio connection control function;
in response to receiving the first message, transmitting, by the radio connection control function, a second message on the service-based interface provided by the radio connection control function;
transmitting, by the radio connection control function, a third message to a radio connection data storage function configured to store information relating to radio connection context data, the third message including a request to store physical resource group context data or a request for retrieving radio connection context data; and
in response to transmitting the third message, receiving, by the radio connection control function, a fourth message from the radio connection data storage function on a service-based interface provided by the radio connection data storage function, the fourth message including a confirmation that the radio connection data storage function stored physical resource group context data or radio connection context data requested in the third message.

9. The method of claim 8, wherein radio connection control includes functions relating to radio access and mobility management.

10. The method of claim 8, further comprising:
transmitting, by the radio connection control function, a fifth message to a radio connection intelligence function; and
in response to transmitting the fifth message, receiving, by the radio connection control function, a sixth message from the radio connection intelligence function, the sixth message including intelligence information provided by the radio connection intelligence function.

11. The method of claim 8, further comprising:
transmitting, by the radio connection control function, a fifth message to a radio connection exposure function; and
in response to transmitting the fifth message, receiving, by the radio connection control function, a sixth message from the radio connection exposure function on a service-based interface provided by the radio connection exposure function.

12. An apparatus for wireless communication comprises a processor that is configured to carry out the method of claim 8.

13. A method for wireless communication, comprising:
receiving, at a radio session and bearer control function, a first message on a service-based interface provided by the radio session and bearer control function;
in response to receiving the first message, transmitting, by the radio session and bearer control function, a second message on the service-based interface provided by the radio session and bearer control function;
transmitting, by the radio session and bearer control function, a third message to a radio session and bearer enforcement function directly or via a proxy function between the radio session and bearer control function and the radio session and bearer enforcement function, the third message including configuration information for enforcement or a request for status information from the radio session and bearer enforcement function; and
in response to transmitting the third message, receiving, by the radio session and bearer control function, a fourth message from the radio session and bearer enforcement function on a service-based interface provided by the radio session and bearer enforcement function directly or via the proxy function between the radio session and bearer control function and the radio session and bearer enforcement function, the fourth message including configuration result information, a status information notification, or requested status information from the radio session and bearer enforcement function.

14. The method of claim 13, further comprising:
transmitting, by the radio session and bearer control function, a fifth message to a radio session and bearer data storage function, the fifth message including a request to store radio session and bearer context data or a request to retrieve radio session and bearer context data; and
in response to transmitting the fifth message, receiving, by the radio session and bearer control function, a sixth message from the radio session and bearer data storage function on a service-based interface provided by the radio session and bearer data storage function, the sixth message including a confirmation that the radio session and bearer data storage function stored radio session and bearer context data or radio session and bearer context data requested in the fifth message.

15. The method of claim 13, further comprising:
transmitting, by the radio session and bearer control function, a fifth message to a radio session and bearer intelligence function; and
in response to transmitting the fifth message, receiving, by the radio session and bearer control function, a sixth message from the radio session and bearer intelligence function on a service-based interface provided by the radio session and bearer intelligence function.

16. The method of claim 13, further comprising:
transmitting, by the radio session and bearer control function, a fifth message to a radio session and bearer exposure function; and
in response to transmitting the fifth message, receiving, by the radio session and bearer control function, a sixth message from the radio session and bearer exposure function on a service-based interface provided by the radio session and bearer exposure function.

17. An apparatus for wireless communication comprises a processor that is configured to carry out the method of claim 13.

* * * * *